(12) United States Patent
Benedetti

(10) Patent No.: US 11,162,520 B2
(45) Date of Patent: Nov. 2, 2021

(54) DUAL MATERIAL U-BASE FASTENER

(71) Applicant: Newfrey LLC, New Britain, CT (US)

(72) Inventor: Steven M. Benedetti, Sterling Heights, MI (US)

(73) Assignee: Newfrey LLC, New Britain, CT (US)

( * ) Notice: Subject to any disclaimer, the term of this patent is extended or adjusted under 35 U.S.C. 154(b) by 42 days.

(21) Appl. No.: 16/814,594

(22) Filed: Mar. 10, 2020

(65) Prior Publication Data

US 2020/0208660 A1     Jul. 2, 2020

Related U.S. Application Data

(63) Continuation of application No. 15/909,057, filed on Mar. 1, 2018, now Pat. No. 10,590,968.

(51) Int. Cl.
  *F16B 2/24* (2006.01)
  *B60R 13/00* (2006.01)
  (Continued)

(52) U.S. Cl.
  CPC .............. *F16B 2/243* (2013.01); *B60R 13/00* (2013.01); *B60R 13/0206* (2013.01);
  (Continued)

(58) Field of Classification Search
  CPC ...... F16B 2/243; F16B 21/075; F16B 5/0657; F16B 5/065; F16B 5/0614; F16B 5/125;
  (Continued)

(56) References Cited

U.S. PATENT DOCUMENTS 4,865,505 A  9/1989  Okada
5,533,237 A  7/1996  Higgins
(Continued)

FOREIGN PATENT DOCUMENTS

EP    1510702 A1    3/2005
EP    2233386 A1    9/2010
(Continued)

OTHER PUBLICATIONS

International Search Report and Written Opinion dated Jun. 5, 2019 in corresponding International Application No. PCT/US2019/020321.

(Continued)

*Primary Examiner* — Robert Sandy
*Assistant Examiner* — Rowland Do
(74) *Attorney, Agent, or Firm* — Harness, Dickey & Pierce, P.L.C.

(57) ABSTRACT

A u-shaped metal portion and a u-shaped plastic portion can be coupled together to define an interior rib receiving cavity between both the metal sides and the plastic sides. The u-shaped metal portion can include a first metal rib retention barb extending interiorly of the plastic portion in the interior rib receiving cavity and can be designed to engage the rib to couple the dual material U-base fastener to a first component rib with the rib received within the interior rib receiving cavity. The u-shaped plastic portion can include a first plastic aperture retention wing extending exteriorly of the metal portion and designed to engage a second component aperture to couple the dual material U-base fastener to the aperture with the inner plastic and outer metal insertion ends extending through the aperture.

22 Claims, 5 Drawing Sheets

(51) Int. Cl.
  *F16B 5/12* (2006.01)
  *B60R 13/02* (2006.01)
  *F16B 5/06* (2006.01)
  *F16B 21/07* (2006.01)

(52) U.S. Cl.
  CPC .......... *F16B 2/245* (2013.01); *F16B 5/0664* (2013.01); *F16B 5/125* (2013.01); *F16B 5/126* (2013.01); *F16B 21/075* (2013.01)

(58) Field of Classification Search
  CPC ........ F16B 5/0664; F16B 5/126; F16B 2/245; B60R 13/00; B60R 13/0206; Y10T 24/304; Y10T 24/307; Y10T 24/30; Y10T 24/309; Y10T 24/44026; Y10T 403/75
  See application file for complete search history.

(56) References Cited

U.S. PATENT DOCUMENTS

| | | |
|---|---|---|
| 5,542,158 A | 8/1996 | Gronau et al. |
| 6,021,986 A | 2/2000 | Murdock |
| 6,381,811 B2 | 5/2002 | Smith et al. |
| 6,438,804 B1 | 8/2002 | Romero Magarino |
| 6,454,507 B1 | 9/2002 | Romero Magarino |
| 6,527,471 B2 | 3/2003 | Smith et al. |
| 6,629,809 B2 | 10/2003 | Vassiliou |
| 6,976,292 B2 | 12/2005 | MacPherson et al. |
| 7,178,850 B2 | 2/2007 | Smith et al. |
| 7,186,051 B2 | 3/2007 | Benedetti et al. |
| 7,226,260 B2 | 6/2007 | Jackson, Jr. et al. |
| 7,356,886 B2 | 4/2008 | Okada |
| 7,374,200 B2 | 5/2008 | Ikeda et al. |
| 7,552,516 B2 | 6/2009 | Okada et al. |
| 8,051,539 B2 | 11/2011 | Benedetti et al. |
| 8,128,145 B2 | 3/2012 | Smith et al. |
| 8,316,513 B2 | 11/2012 | DeJong et al. |
| 8,950,042 B2 | 2/2015 | Smith et al. |
| 9,080,588 B2 | 7/2015 | Diez Herrera et al. |
| 9,562,554 B2 | 2/2017 | Vidal et al. |
| 2002/0001502 A1 | 1/2002 | Smith et al. |
| 2005/0105987 A1 | 5/2005 | Giugliano et al. |
| 2005/0236861 A1 | 10/2005 | Slobodecki et al. |
| 2006/0168773 A1 | 8/2006 | Smith et al. |
| 2008/0086850 A1 | 4/2008 | Smith et al. |
| 2008/0098576 A1 | 5/2008 | Smith et al. |
| 2009/0205174 A1 | 8/2009 | Slobodecki et al. |
| 2009/0293237 A1 | 12/2009 | Benedetti et al. |
| 2011/0116890 A1 | 5/2011 | Okada et al. |
| 2015/0211565 A1 | 7/2015 | Benedetti |
| 2015/0267734 A1 | 9/2015 | Boyer et al. |
| 2015/0321622 A1 | 11/2015 | Dickinson et al. |
| 2016/0214520 A1 | 7/2016 | Kajio |
| 2016/0356298 A1 | 12/2016 | Pquet |
| 2016/0375840 A1 | 12/2016 | Dickinson et al. |
| 2017/0113629 A1 | 4/2017 | Dickinson et al. |
| 2017/0113632 A1 | 4/2017 | Dickinson et al. |

FOREIGN PATENT DOCUMENTS

| | | |
|---|---|---|
| FR | 2976986 A1 | 12/2012 |
| WO | WO-2012/104250 A1 | 8/2012 |

OTHER PUBLICATIONS

Extended European Search Report dated Oct. 28, 2019 in European Patent Application No. 19177827.3.

DUAL MATERIAL U-BASE FASTENER

CROSS-REFERENCE TO RELATED APPLICATIONS

This application is a continuation of U.S. patent application Ser. No. 15/909,057 filed on Mar. 1, 2018. The above application is hereby incorporated herein by reference in its entirety.

FIELD

The present disclosure relates to U-base resilient fasteners, and more particularly to such fasteners in which each component or portion is formed of a different material.

BACKGROUND

This section provides background information related to the present disclosure which is not necessarily prior art.

Various types of fasteners are often used to connect mating components in products, vehicles, and other environments. One type of fastener is a U-base fastener. U-base fasteners (or U-base clips) are of particular use to easily attach two mating components to one another. One component typically has a feature such as a rib that is received into the central aperture of the U-base fastener and the rib is secured within the U-base fastener. The component can then be secured to a second component by inserting the U-base fastener into an opening in the second component. A barb or other feature of the U-base fastener typically retains the rib inside the U-base fastener and outwardly extending wings of the U-base fastener secure the U-base fastener in the opening in the second component.

One application for U-base fasteners is in the context of securing components at a desired location in a vehicle. Such components in vehicles can include interior trim components, exterior trim components, fascia components and various other covers, ornamentation and the like. The components may be made of various materials such as metal, plastic, wood or composites. One consideration involved in the design of U-base fasteners, therefore, is the compatibility of the clip with the components that it will be used to secure in a desired location. The compatibility of the U-base fastener with the surrounding components permits the surrounding components to be easily inserted into the U-base fastener and permits the U-base fastener to be inserted into an opening while sufficiently retaining the component in the U-base fastener and retaining the U-base fastener in the opening. There exists a need, therefore, for a U-base fastener that is compatible with a variety of component materials and in a variety of applications.

SUMMARY

This section provides a general summary of the disclosure, and is not a comprehensive disclosure of its full scope or all of its features.

In accordance with one aspect of the present disclosure, a dual material U-base fastener designed to connect a first component having a rib to a second component having an aperture can include a u-shaped metal portion and a u-shaped plastic portion. The u-shaped metal portion can include a first metal side and a second metal side connected at an outer metal insertion end to form the u-shaped metal portion. The u-shaped plastic portion can include a first plastic side and a second plastic side connected at an inner plastic insertion end to form the u-shaped plastic portion. The metal portion and the plastic portion can be coupled together to define an interior rib receiving cavity between both the first and second metal sides and the first and second plastic sides. The u-shaped metal portion can include a first metal rib retention barb extending interiorly of the plastic portion in the interior rib receiving cavity and designed to engage the rib to couple the dual material U-base fastener to the rib with the rib received within the interior rib receiving cavity. The u-shaped plastic portion can include a first plastic aperture retention wing extending exteriorly of the metal portion and designed to engage the aperture to couple the dual material U-base fastener to the aperture with the inner plastic and outer metal insertion ends extending through the aperture.

In accordance with another aspect of the present disclosure, a dual material U-base fastener designed to connect a first component having a rib to a second component having an aperture can include a u-shaped metal portion and a u-shaped plastic portion. The u-shaped metal portion can include a first metal side and a second metal side connected at an outer metal insertion end to form the u-shaped metal portion. The first metal side and the second metal side can include a first opening and a second opening, respectively, therethrough, and can support a first metal rib retention barb and a second metal rib retention barb, respectively. The u-shaped plastic portion can include a first plastic side and a second plastic side connected at an inner plastic insertion end to form the u-shaped plastic portion. The first plastic side and the second plastic side can include a first plastic aperture retention wing and a second aperture retention wing, respectively. The plastic portion and the metal portion can be coupled together to define an interior rib receiving cavity between both the first and second metal sides of the metal portion and the first and second plastic sides of the plastic portion, + and wherein the inner plastic insertion end is received in the outer metal insertion end. The aperture retention wings can project outwardly through the first and second openings respectively, and the first and second metal rib retention barbs can extend inwardly into the interior rib receiving cavity. The first and second plastic aperture retention wings can be designed to couple the dual material U-base fastener to the aperture with the inner plastic and outer metal insertion ends extending through the aperture. The first and second metal rib retention barbs can be designed to couple the dual material U-base fastener to the rib with the rib received within the interior rib receiving cavity.

In accordance with another aspect of the present disclosure, a dual component U-base fastener can be used for connecting a first component having a rib to a second component having an aperture. The dual component U-base fastener includes a u-shaped outer component comprising at least one rib retention barb and a u-shaped inner component comprising at least one aperture retention wing. The outer component and the inner component are separate and are coupled together to create an assembled unit defining an interior rib receiving cavity with the at least one rib retention barb extending into the interior rib receiving cavity and the at least one aperture retention wing of the inner component extending exteriorly from the outer component.

In another aspect, the at least one rib retention barb is engageable with the rib on the first component to couple the assembled unit to the rib, and the at least one aperture retention wing is engageable with the aperture in the second component in which the assembled unit is inserted to couple the assembled unit to the second component.

In accordance with another aspect of the present disclosure, a dual component U-base fastener can be used for connecting a first part having a rib to a second part having an aperture. The dual component U-base fastener includes a u-shaped first component comprising rib retention barbs and a u-shaped second component comprising aperture retention wings. The first component, including the rib retention barbs, is formed of a first structural material and the second component, including the aperture retention wings, is formed of a second structural material that is different from the first structural material.

In accordance with another aspect of the present disclosure, a dual component U-base fastener can be used for connecting a first component having a rib to a second component having an aperture. The dual component U-base fastener includes a u-shaped outer component comprising inwardly extending rib retention barbs and an opening through each side. The dual component U-base fastener also includes a u-shaped inner component comprising outward extending aperture retention wings. The inner component is received in the outer component with the aperture retention wings extending outwardly through the opening on each side of the outer component. The inner component and the second component are separate components that are coupled together creating an assembled unit. The outer component is formed of a first structural material and the inner component is formed of a second structural material that is different from the first structural material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

As shown in FIGS. 1-12, one example dual component U-base fastener 30 may include an outer component 32 and an inner component 34. The inner component 34 is received into the outer component 32 and can be removed from the outer component 32 if desired. The outer component 32 is the portion of the U-base fastener 30 that includes the barbs that secure the U-base fastener 30 to a rib of a first part that is received within the central cavity of the fastener. The inner component 34 is received inside the outer component 32 and is the portion of the U-base fastener 30 that includes the retention wings that secure the U-base fastener 30 to the aperture in the second part.

Figure 4:
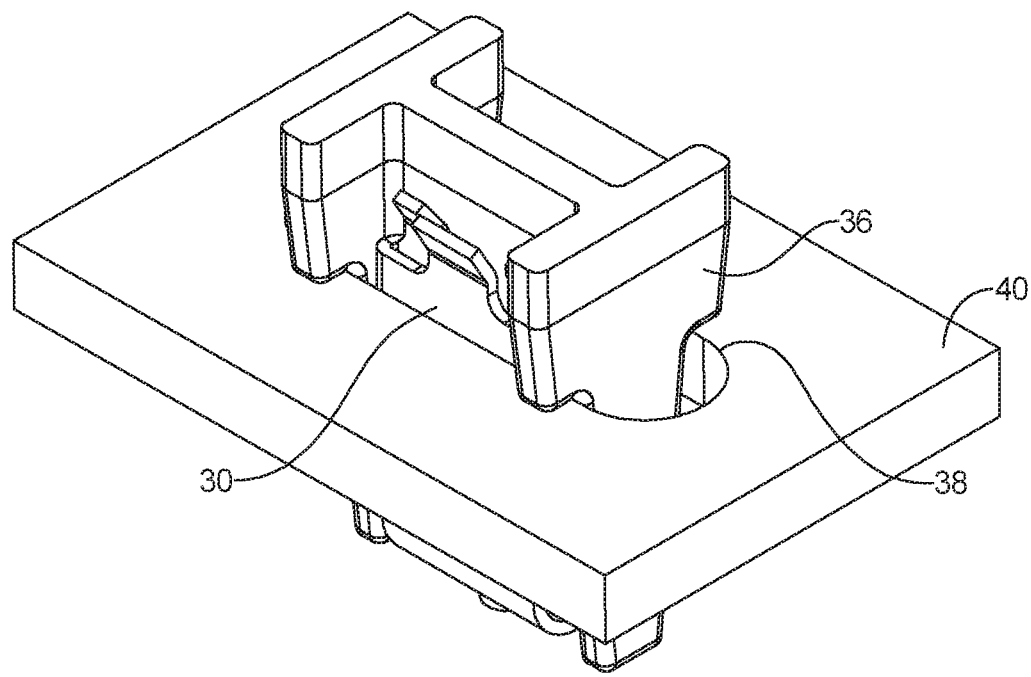
FIG. 4 is a perspective view of the example dual component U-base fastener of FIG. 1 shown coupled to a rib of a first part and an aperture of a second part.
Figure 5:
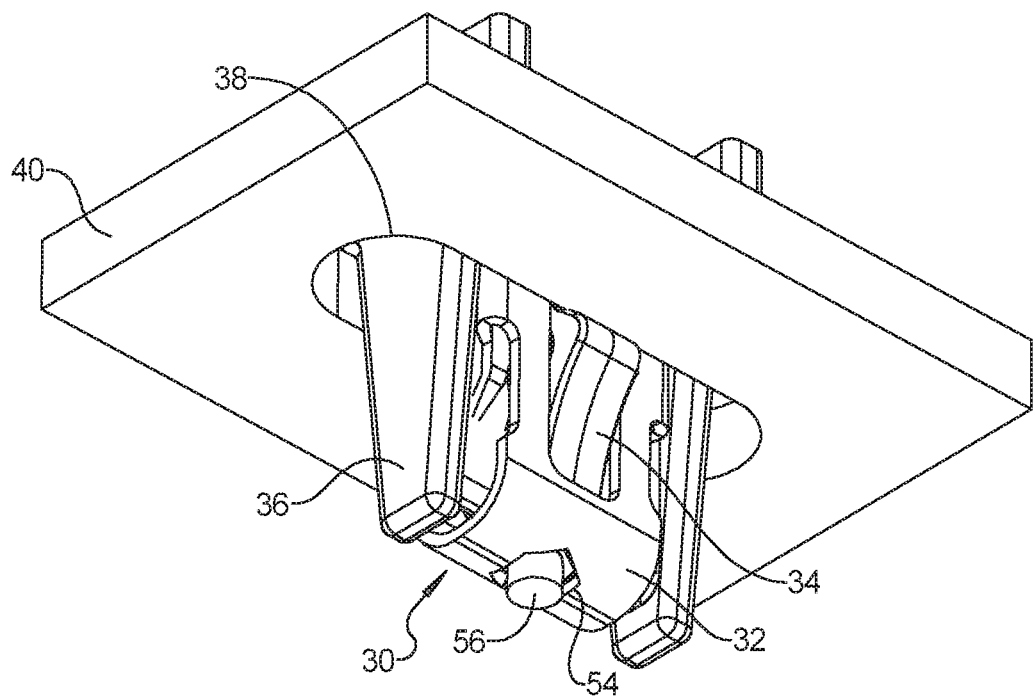
FIG. 5 is a perspective view similar to FIG. 4 but from a different angle.
Figure 6:
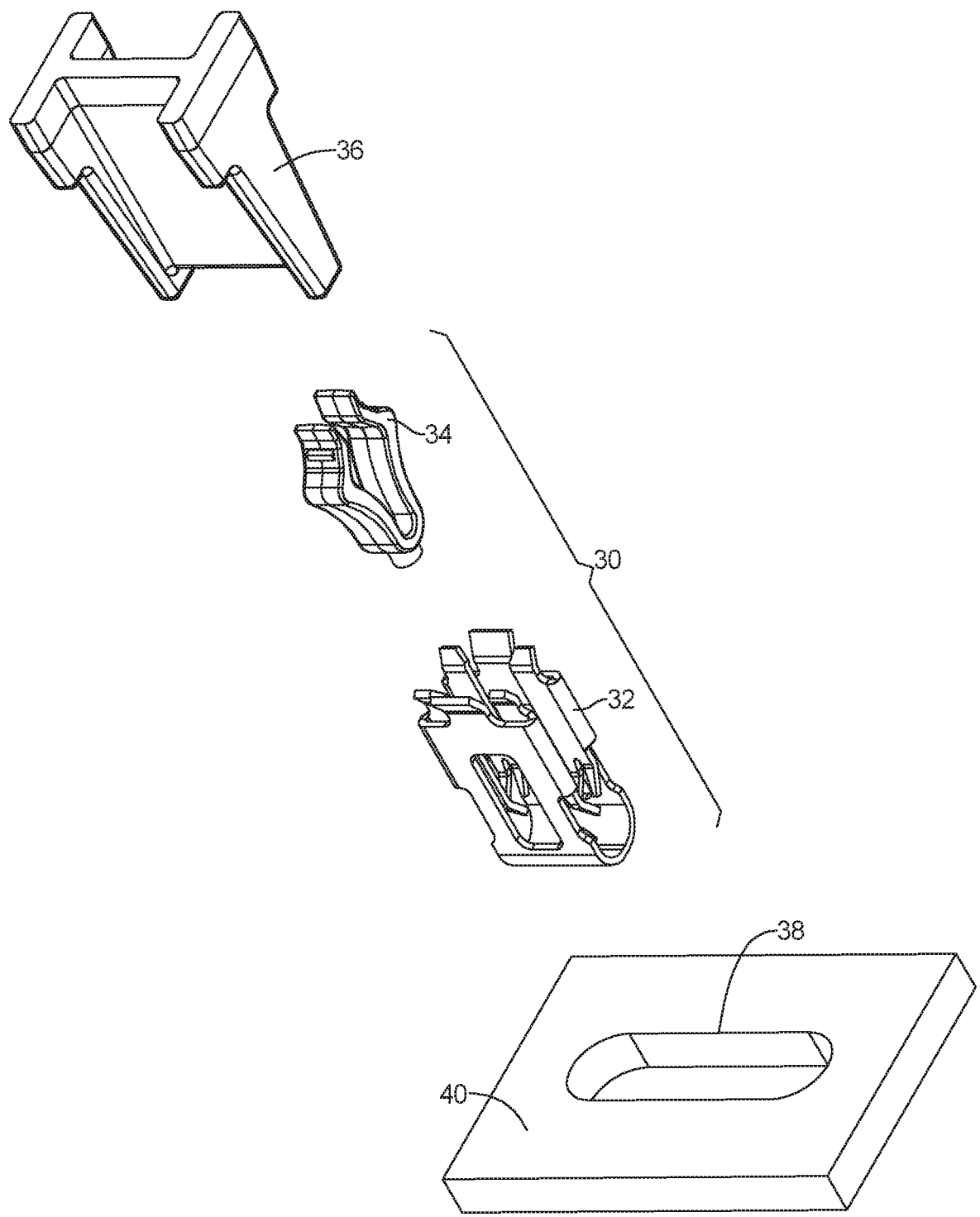
FIG. 6 is an exploded perspective view of the view of FIG. 4.

As shown in FIGS. 4-6, a rib 36 is inserted into the outer component 32 of the U-base fastener 30 to secure a first part (not shown) to the U-base fastener 30. The U-base fastener 30 can then be inserted into an aperture 38 on a second part or panel 40 as shown. The inner component 34 engages the panel 40 at the aperture 38 to secure the rib 36 at the aperture 38. In this manner, the first part can be secured relative to the second part.

Referring back to FIGS. 1-3, the outer component 32 can include a first side 42 and a second side 44 that are spaced apart from one another. The first side 42 and the second side 44 are connected to one another at the insertion end 46. In this example, the insertion end 46 is rounded such that the first side 42, the second side 44 and the insertion end 46 create a U-shape when viewed from the side of the U-base fastener 30 as shown in FIG. 2. As contemplated herein, a U-shape can include variations on the shape shown in FIGS. 1-3. For example, U-shape can mean any suitable shape in which a first side is connected to a second side at an insertion end such that a rib 36 can be inserted between the first and second side. The term U-shape includes V-shapes or other shapes with curved, flat or non-linear sides or insertion ends.

As shown, the inner component 34 can have a profile that corresponds to the profile of the outer component 32. In this example, the inner component 34 includes a first retention wing 48 and a second retention wing 50 that are spaced apart from one another. The first retention wing 48 and the second retention wing 50 can be connected to one another by an insertion or nesting end 52 of the inner component 34. The nesting end 52 can be rounded to create a u-shaped profile of the inner component 34 that can nest inside the outer component 32.

Figure 1:
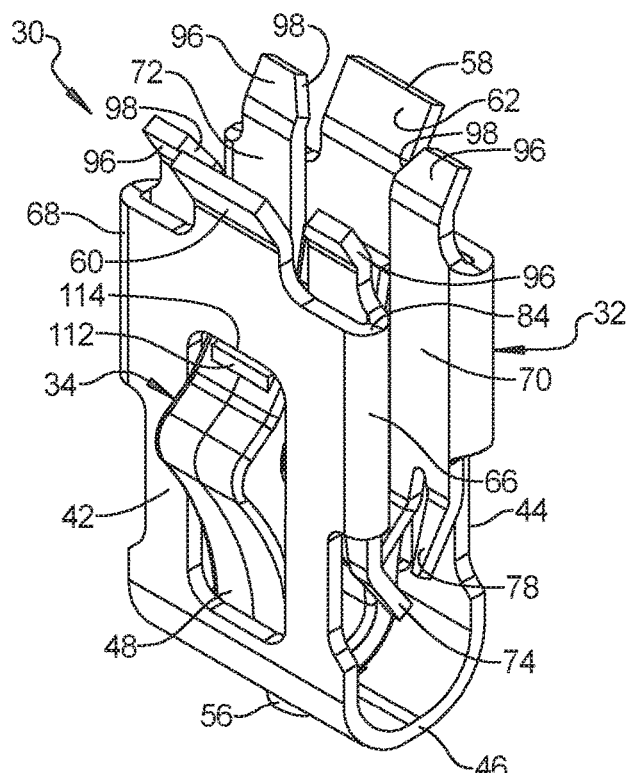
FIG. 1 is a perspective view of an example dual component U-base fastener in accordance with the present disclosure.
Figure 2:
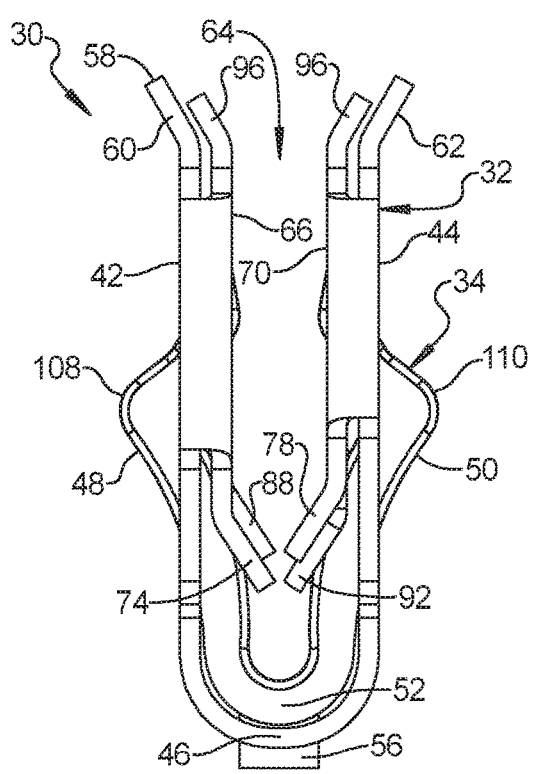
FIG. 2 is a side elevation view of the example dual component U-base fastener of FIG. 1.
Figure 3:
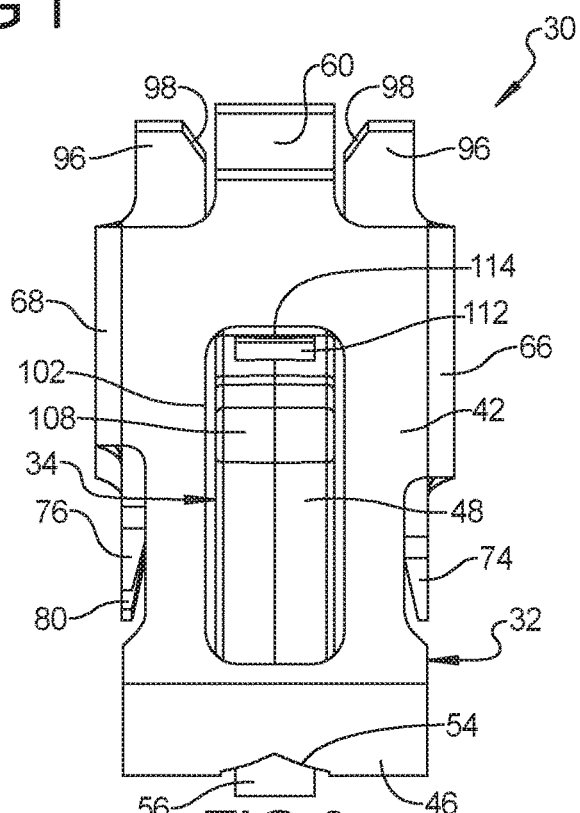
FIG. 3 is a front elevation view of the example dual component U-base fastener of FIG. 1.

As further shown in FIGS. 1-3 and in FIG. 5, the outer component 32 can include a hole 54 in the insertion end 46. In the example shown, the hole 54 is a hexagonal shaped opening in the center of the insertion end 46. The hole 54 is sized to receive a post 56 that is located on the nesting end 52 of the inner component 34. In this example, the post 56 is a cylindrical projection that projects away from the nesting end 52 of the inner component 34. When the post 56 is inserted into the hole 54, the inner component 34 is centered inside the outer component 32 between the first side 42 and the second side 44. As shown, the post 56 can be positioned in the hole 54 with an edge of the hole 54 positioned closely adjacent to the outer surface of the post 56. In this manner, the post 56 can limit movement of the inner component 34 in a translational manner or limit the inner component 34 from rotating inside the outer component 32.

Figure 7:
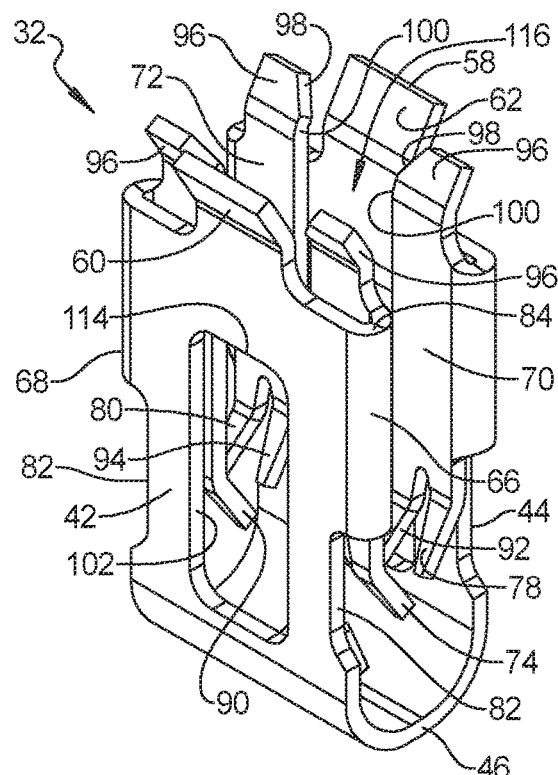
FIG. 7 is a perspective view of the outer component of the dual component U-base fastener of FIG. 1.
Figure 8:
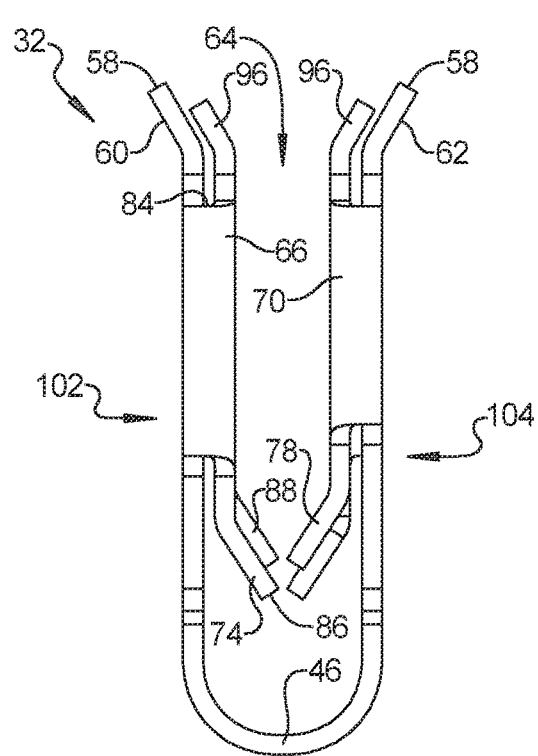
FIG. 8 is a side elevation view of the outer component shown in FIG. 7.
Figure 9:
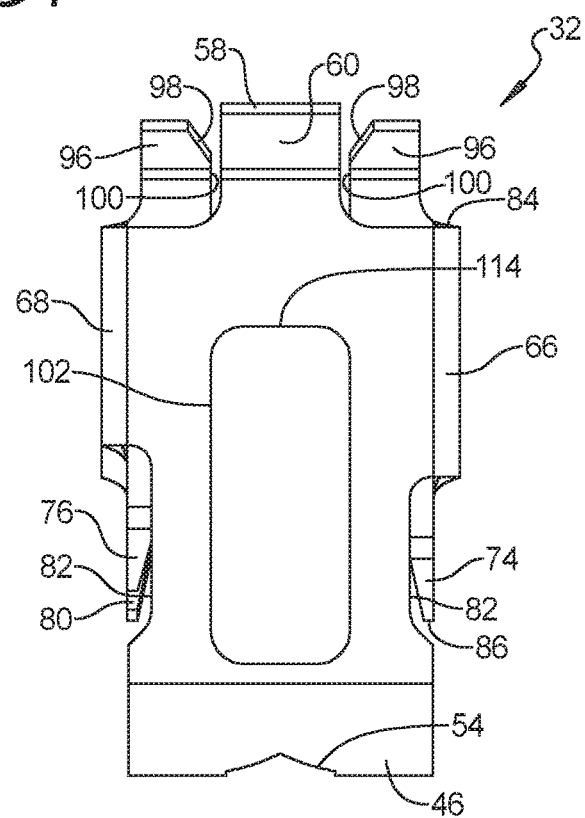
FIG. 9 is a front elevation view of the outer component shown in FIG. 7.

As shown in FIGS. 7-9, the first side 42 and the second side 44 can extend away from the insertion end 46 of the outer component 32 and terminate at a terminating end 58. In this manner, the first side 42 and the second side 44 define a central cavity 64 of the outer component 32 in which the rib 36 can be inserted (see FIG. 4). The first side 42 can include a first flange 60 and the second side 44 can include a second flange 62. The first flange 60 and the second flange 62, in this example, bend away from the first side 42 and the second side 44, respectively, and away from the central cavity 64 of the outer component 32. This shape of the outer component 32 can create a funnel shape whereby the inner component 34 is guided into the outer component 32 by the first flange 60 and the second flange 62 when the inner component 34 is inserted into the outer component 32.

As further shown in FIGS. 7-9, the outer component 32 can also include at least one barb extension and at least one barb. In the example shown, the outer component 32 includes a first barb extension 66, a second barb extension 68, a third barb extension 70, a fourth barb extension 72, a first barb 74, a second barb 76, a third barb 78 and a fourth barb 80. In this example, each of the four barb extensions and each of the four barbs are similar to one another. The first barb extension 66 and the first barb 74 are hereinafter described but it should be appreciated that the other barb extensions and the other barbs can have a similar structure and can be symmetrically disposed or mirrored on an opposite side of the outer component 32.

As shown, the first barb 74 is connected to the first side 42 of the outer component 32 by the first barb extension 66. The first barb extension 66 extends laterally away from a lateral edge 82 of the first side 42. A portion of the first barb extension 66 can be positioned laterally outside the lateral edge 82. The first barb extension 66 then bends back toward the central cavity 64 of the outer component 32 such that a portion of the first barb extension 66 overlaps the inner surface of the adjacent first side 42. As such, the first barb extension 66 is folded so that it is disposed between the first side 42 and the second side 44 in the central cavity 64 of the outer component 32. As further shown, the bent portion of the first barb extension 66 has a rounded or curved shaped so that the bent portion of the first barb extension 66 has a u-shape when viewed from the terminating end 58 of the outer component 32. The bent portion of the first barb extension 66 can have other shapes or profiles as well. The bent portion of the first barb extension 66, in other examples, can have a V-shape or a rectangular shape or can be crimped such that it has a substantially flat profile.

As shown on FIG. 9, the lateral edges 82 of the outer component 32, in this example, are not linear when viewed from the front. The lateral edges 82 have an offset portion toward the terminating end 58. As can be seen, the lateral edges 82 extend upward from the insertion end 46 along a first portion and then move inwardly toward a center of the outer component 32. The first barb extension 66 and the second barb extension 68 can be positioned at the offset portion of the lateral edges 82 as shown.

The first barb extension 66, in this example, is joined to the first barb 74 at a bend 84 located toward the portion of the first barb extension 66 facing the insertion end 46 of the outer component 32. The first barb 74 can be angled inward and away from the first side 42 such that a distal end 86 of the first barb 74 extends into the central cavity 64 of the outer component 32. The second barb extension 68 and the second barb 76 can be similarly configured as shown in FIGS. 7 and 8 such that the first barb 74 and the second barb 76 each extend inward from the first side 42 into the central cavity 64 of the outer component 32 and are pointed toward the insertion end 46.

As previously discussed, the outer component 32 can also include the third barb extension 70, the third barb 78, the fourth barb extension 72 and the fourth barb 80 similarly configured and oppositely arranged on the second side 44 of the outer component 32. As can be appreciated, the first barb 74 and the third barb 78 are located opposite one another and the second barb 76 and the fourth barb 80 are located opposite one another. The distal ends of the opposing barbs can terminate at approximately the same vertical plane disposed along the center of central cavity 64 of the outer component 32 between and substantially parallel to the first side 42 and the second side 44. As further shown, opposing barbs (such as first barb 74 and third barb 78) can be bent inward at different vertical heights such that the distal ends of the opposing barbs (e.g., first barb 74 and third barb 78) are positioned at different vertical heights.

During installation, the rib 36 can be inserted into the central cavity 64 of the outer component 32 between the first side 42 and the second side 44. The rib 36 contacts and pushes past the barbs causing the barbs to engage and retain the rib 36. If the rib 36 is attempted to be removed from the central cavity 64 of the outer component 32, such movement of the rib 36 is resisted by the barbs. As can be appreciated, the distal ends of the barbs engage the surface of the rib 36 and prevent the rib 36 from being undesirably removed.

The first barb 74, the second barb 76, the third barb 78 and/or the fourth barb 80 can have any suitable shape or profile to engage the rib 36 as previously described. In addition, the outer component 32 can include a single barb at each of the barb extensions. In the example shown, however, two barbs project outward from the first barb extension 66, the second barb extension 68, the third barb extension 70 and the fourth barb extension 72. Thus, the outer component 32, in the example shown, includes a fifth barb 88, a sixth barb 90, a seventh barb 92 and an eighth barb 94. The fifth barb 88 is connected to the first barb extension 66 adjacent to the first barb 74. The sixth barb 90 is connected to the second barb extension 68 adjacent to the second barb 76. The seventh barb 92 is connected to the third barb extension 70 adjacent to the third barb 78. The eighth barb 94 is connected to the fourth barb extension 72 adjacent to the fourth barb 80.

As shown in FIGS. 7 and 8, the first barb 74 and the fifth barb 88 can have different lengths such that the distal ends of the first barb 74 and the fifth barb 88 are positioned at different vertical heights with respect to the insertion end 46. The first barb 74 and the fifth barb 88 can be angled away from the first barb extension 66 at substantially similar angles such that the distal ends of the first barb 74 and the fifth barb project inwardly approximately the same inward distance into the central cavity 64 from the first side 42. With this configuration, the first barb 74 and the fifth barb 88 can be configured to engage the rib 36 at different vertical heights on the rib 36.

The second barb 76 and the sixth barb 90 as well as the third barb 78 and the seventh barb 92 and the fourth barb 80 and the eighth barb 94 can be similarly positioned relative to one another as previously described. In other examples, a pair of barbs on a barb extension (e.g., the first barb 74 and the fifth barb 88) can have other shapes, lengths and relative angles other than that previously described to accommodate different size ribs or as may otherwise be needed to increase or decrease the retention force (or the insertion force) of outer component 32.

As further shown in FIGS. 7-9, the outer component 32 can include a guide tab 96 positioned at the terminating end 58 at the first barb extension 66, the second barb extension 68, the third barb extension 70 and the fourth barb extension 72. The guide tabs 96 can project upward from the outer component 32 in a similar direction as the first flange 60 and the second flange 62. The guide tabs 96 can also be angled outward away from the central cavity 64 of the outer component 32. As such, the guide tabs 96 can assist in guiding the rib 36 into the central cavity 64 of the outer component 32 when the rib 36 is inserted into the outer component 32.

The guide tabs 96 can also include chamfers 98 that are positioned on inner edges 100 of the guide tabs 96. The chamfers 98 are angled edges that are angled inward toward a center of the first side 42 and the second side 44. The chamfers 98 can assist in guiding the inner component 34 into outer component 32. The inner edges 100 continue along the edges of the barb extensions toward the insertion end 46 of the outer component 32. In this manner, the inner edges 100 define a channel 116 in the center of the outer component 32 in which the inner component 34 slides when it is inserted into the outer component 32.

As further shown, the outer component 32 can include a first opening 102 and a second opening 104 in the first side 42 and the second side 44, respectively. The first opening 102 can be positioned in the center of the first side 42 between the inner edges 100 of the first barb extension 66 and the second barb extension 68. The second opening 104 can be positioned in the center of the second side 44 between the inner edges 100 of the third barb extension 70 and the fourth barb extension 72. In the example shown, the first opening 102 and the second opening 104 are rectangular elongated slots that are elongated in the direction between the terminating end 58 and the insertion end 46. The first opening 102 and the second opening 104 are sized so that the first retention wing 48 and the second retention wing 50 of the inner component 34 can project outward from the central cavity 64 of the outer component 32 through the first opening 102 and the second opening 104, respectively, when the inner component 34 is inserted into the outer component 32.

Figure 10:
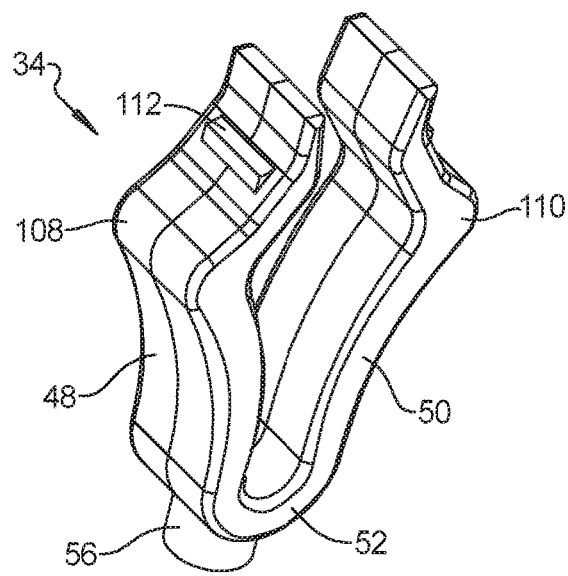
FIG. 10 is a perspective view of the inner component of the dual component U-base fastener of FIG. 1.
Figure 11:
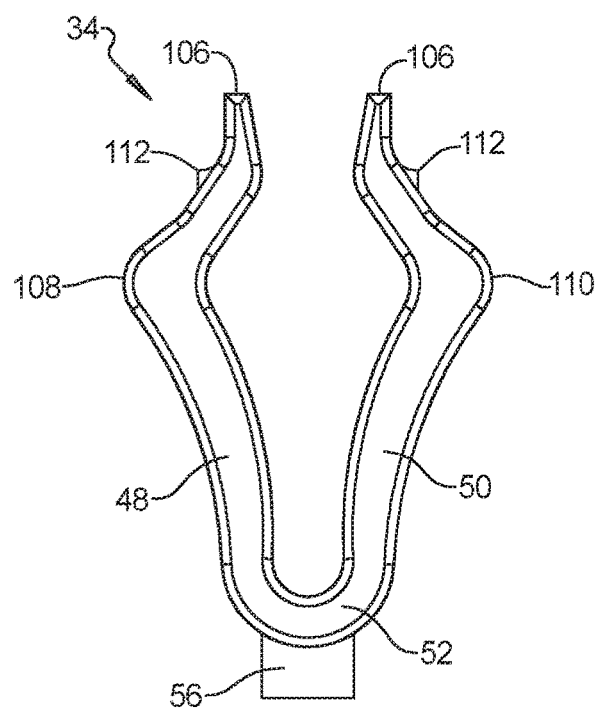
FIG. 11 is a side elevation view of the inner component shown in FIG. 10.
Figure 12:
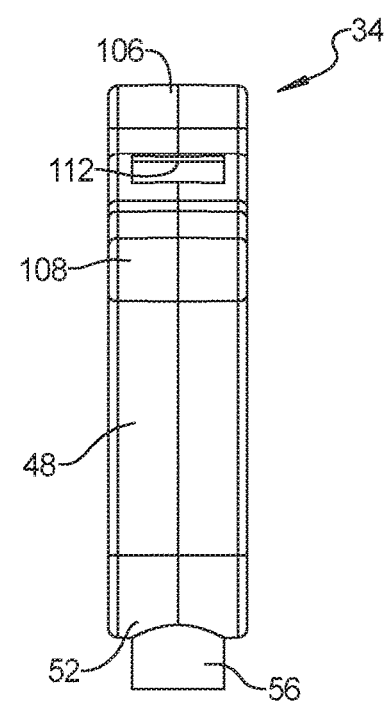
FIG. 12 is a front elevation view of the inner component shown in FIG. 10.

Referring now to FIGS. 10-12, the inner component 34, as previously described, can include the first retention wing 48 and the second retention wing 50. The first retention wing 48 and the second retention wing 50 can be connected to one another at the nesting end 52 and extend away from the nesting end 52 to the trailing end 106. The first retention wing 48 can project outward from the nesting end 52 to a first shoulder 108. The first retention wing 48 can then be angled back toward a center of the inner component 34 at a region of the first retention wing 48 located between the first shoulder 108 and the trailing end 106. The second retention wing 50 can be similarly shaped and can project outward from the nesting end 52 to a second shoulder 110. The second retention wing 50 can then angle back toward the center of the inner component 34 in the region of the second retention wing 50 between the second shoulder 110 and the trailing end 106.

In the example shown in FIGS. 10-12, the inner component 34 has a rounded diamond shape. The first retention wing 48 and the second retention wing 50 can flex toward one another and then return to their original positions. In this manner, the inner component 34 can deform when the U-base fastener 30 is inserted into the aperture 38 of the panel 40. The first retention wing 48 and the second retention wing 50 can engage the aperture 38 in the panel 40 to retain the U-base fastener 30 to the panel 40 as shown in FIG. 5.

In other examples, the inner component 34 can have other shapes or have other profiles. In one such alternate example, the first retention wing 48 and/or the second retention wing 50 can have a convex shape (rather than a generally concave or flat shape as shown in FIG. 11) between the first shoulder 108 and the trailing end 106 and/or between the second shoulder 110 and the trailing end 106. In such an example, the first shoulder 108 and the second shoulder 110 can have a localized flat section that is designed to be positioned adjacent the panel 40 when the U-base fastener is inserted into the aperture 38. Such a localized flat area can be a step (not shown) at the transition of the convex portion to the first shoulder 108 and/or the second shoulder 110.

In addition to retaining the U-base fastener 30 to the panel 40, the first retention wing 48 and the second retention wing 50 can also retain the inner component 34 to the outer component 32. The first retention wing 48 and the second retention wing 50 have lateral widths that are smaller than the lateral widths of the first opening 102 and the second opening 104. As such, the first retention wing 48 and the second retention wing 50 can project through the first opening 102 and the second opening 104, respectively, when the inner component 34 is inserted into the outer component 32.

As shown in FIGS. 1, 3 and 7, the first retention wing 48 and the second retention wing 50 can each include a retention tooth 112. The retention tooth 112 is a projection that protrudes from the outer surface of the first retention wing 48 at a position between the first shoulder 108 and the trailing end 106. The retention tooth 112, in the example shown, is elongated along the transverse direction of the first retention wing 48 in a position such that the retention tooth 112 resides at a position at or near a top edge 114 of the first opening 102. The retention tooth 112 can have a flat surface that can abut the top edge 114 of the first opening 102 if the inner component 34 is moved in a direction toward the terminating end 58 of the outer component 32. In this manner, the retention tooth 112 limits the inner component 34 from moving in a direction toward the terminating end 58 of the outer component 32. The retention tooth 112 prevents the inner component 34 from disengaging from the outer component 32. The second retention wing 50 can also include a similarly positioned retention tooth 112 positioned along its outer surface to interface with the second opening 104 to further inhibit the movement of the inner component 34 relative to the outer component 32 and to prevent the inner component 34 from disengaging from the outer component 32.

In other examples, the retention tooth 112 can have other shapes or profiles to limit the movement of the inner component 34 relative to the outer component 32. For example, the retention tooth 112 can be a groove or differently shaped projection positioned at or near an interfacing portion of the first opening 102 or the second opening 104. In still other examples, the retention tooth 112 can interface with a complimentary groove or projection on a side edge of the first opening 102 or the second opening 104.

In one example, the U-base fastener 30 includes an outer component 32 and an inner component 34 that are made of different materials. For example, the outer component 32 can be pierced, stamped and/or otherwise formed from steel and the inner component 34 can be molded from plastic. In one example, the outer component 32 is made of SAE 1050 carbon steel and can be heat treated or provided with a suitable corrosion resistive coating. The inner component 34 can be molded of Polyoxymethylene (POM), suitable nylon (e.g., PA66 or PA12) or other thermoplastic. In other examples, other materials can be used.

The outer component 32 and the inner component 34 can be made of structural materials. As used in the present disclosure, the term "structural material" means a material that gives a component or element its primary structural properties. For example, the structural material of the barbs gives them the primary structural properties (e.g., resilience) required to couple the barb to the rib. Similarly, the structural material of the retention wings gives them the primary structural properties (e.g., resilience) required to couple the wing to an aperture as described herein. In contrast, a flexible sealant material carried by a structural material is not a structural material because it is only a secondary, "non-structural" material. For example, the outer component 32 can be made of a structural material that permits the first barb 74 (or other barbs) to engage the rib 36 to retain the U-base fastener to the rib 36. As described above, such a structural material can be a suitable carbon steel material. The inner component 34 can also be made of structural material that permits the first retention wing 48 and/or the second retention wing 50 to engage the aperture 38 to retain the U-base fastener 30 to the panel 40. As described above, such a structural material can be a suitable nylon or other thermoplastic.

In existing fastener designs, fastener can often be made of a single type of material. Such existing designs often include a fastener that is made completely of steel or completely of plastic. Such single material fasteners present problems that can be solved by the dual component U-base fastener of the present disclosure. When an all-steel fastener is inserted into an opening in a panel, the steel fastener can plastically deform the opening in the panel or cause plastic deformation to the opening of the panel after extended use. The plastic deformation can enlarge or change the shape of the opening in the panel. This, in turn, can cause the fastener to become loose in the opening in the panel. For this reason, it can be desirable for one or more elements of the fastener to be made of the same material or of a compatible material with that of the panel material. For example, it can be desirable for the first and/or second retention wings 48, 50 to be made of a plastic material in circumstances where the panel 40 with the aperture 38 is made of a plastic material.

In existing all-plastic fasteners, the all-plastic fasteners are often window-engaging fasteners rather than having the barbs as previously described. In such window-engaging fasteners, the window-engaging fastener can have a retention arm that engages a window in a rib. The window is an opening through the face of the rib. The retention arm of the window-engaging fastener is flexible and grips an edge of the window to retain the window-engaging fastener to the rib. It is often necessary to insert the retention arm(s) of such window-engaging fasteners past the window of the rib in order for the retention arm(s) to engage the window. Such over-travel of the window-engaging fasteners can cause damage to the rib or the part connected to the rib. Since the U-base fastener of the present disclosure engages the rib using the rib retention barbs, such over-travel of the U-base fastener of present disclosure is unnecessary. Thus, the U-base fasteners of the present disclosure can be used in circumstances to replace a window-engaging fastener. Furthermore, the U-base fasteners of the present disclosure can be used in circumstances where a window-engaging fastener cannot be used because a rib with a window cannot be added to existing molding tools that do not have packaging space to add complex molding tool cores with action to create windows in the ribs.

The dual component U-base fasteners of the present disclosure can also provide other advantages of single-material and/or single component designs. In other examples the U-base fastener of the present disclosure, different inner components 34 can be used with a common outer component 32. For example, a common outer component 32 can be used with multiple different inner components 34. In such examples, the different inner components 34 can be made of different materials so as to be compatible with panels 40 made of different materials. The different inner components 34 can also have the same or similar shape as that shown in FIGS. 10-12 but can have different first retention wings 48 and/or different second retention wings 50 that can accommodate panels 40 with different thicknesses. In such examples, the vertical location of the first shoulder 108 and/or the vertical location of the second shoulder 110 relative to the nesting end 52 can be increased or decreased between the different inner components 34 so that the first retention wing 48 and/or the second retention wing 50 can retain the U-base fastener 30 to the panels 40 with different thicknesses.

In the previously described example dual component U-base fasteners, the different inner components 34 can be made of different color materials. Such different colors can be used to indicate the type and/or thickness of the panel 40 that is compatible with the inner component 34. In other examples, other indicators can be used to indicate the compatibility of the inner component 34 or of the U-base fastener 30.

In other circumstances, a part may have shapes or other features that do not permit the addition of structures other than simple rib towers (i.e., rib tower without windows). The dual component U-base fastener of the present disclosure can be used in connection with such simple rib towers to secure such a part in a desired location. In addition, the folded barb extensions of the U-base fastener of the present disclosure permit the U-base fastener to have a relatively smaller width as compared with existing U-base fasteners. Thus, the U-base fastener of the present disclosure can be used in applications in which smaller width fasteners are required.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the terms first, second, third, etc. are used herein to describe various elements, components, regions, layers and/or sections, these elements, components, regions, layers and/or sections should not be limited by these terms. These terms are only used to distinguish one element, component, region, layer or section from another region, layer or section. Terms such as "first," "second," and other numerical terms when used herein do not imply a sequence or order unless clearly indicated by the context.

Spatially relative terms, such as "inner," "outer," "beneath," "below," "lower," "above," "upper," and the like, are used herein for ease of description to describe one element or feature's relationship to another element(s) or feature(s) as illustrated in the figures. Spatially relative terms are intended to encompass different orientations of the device in addition to the orientation depicted in the figures.

What is claimed is:

1. A dual material U-base fastener designed to connect a first component having a rib to a second component having an aperture comprising:
    a u-shaped metal portion including a first metal side and a second metal side connected at an outer metal insertion end to form the u-shaped metal portion;
    a u-shaped plastic portion including a first plastic side and a second plastic side connected at an inner plastic insertion end to form the u-shaped plastic portion; and
    wherein the metal portion and the plastic portion are coupled together with the inner plastic insertion end positioned interiorly of the outer metal insertion end to define an interior rib receiving cavity between both the first and second metal sides and the first and second plastic sides, and wherein the u-shaped metal portion includes a first metal rib retention barb extending interiorly of the plastic portion in the interior rib receiving cavity and designed to engage the rib to couple the dual material U-base fastener to the rib with the rib received within the interior rib receiving cavity, and wherein the u-shaped plastic portion includes a first plastic aperture retention wing extending exteriorly of the metal portion and designed to engage the aperture to couple the dual material U-base fastener to the aperture with the inner plastic and outer metal insertion ends extending through the aperture.

2. The dual material U-base fastener of claim 1, wherein a molded plastic material comprises the u-shaped plastic portion.

3. The dual material U-base fastener of claim 1, wherein a formed metal sheet material comprises the u-shaped metal portion.

4. The dual material U-base fastener of claim 1, wherein a molded plastic material comprises the u-shaped plastic portion and a formed metal sheet material comprises the u-shaped metal portion.

5. The dual material U-base fastener of claim 1, wherein the first metal rib retention barb is supported by a first metal barb extension between the first metal side of the metal portion and the first metal rib retention barb.

6. The dual material U-base fastener of claim 5, wherein a second metal rib retention barb is supported by the first metal barb extension.

7. The dual material U-base fastener of claim 5, wherein a second metal rib retention barb is supported by a second metal barb extension between the second metal side of the metal portion and the second metal rib retention barb.

8. The dual material U-base fastener of claim 7, wherein a third metal rib retention barb is supported by the first metal barb extension, and wherein a fourth metal rib retention barb is supported by the second metal barb extension.

9. The dual material U-base fastener of claim 1, wherein the first metal side includes a first metal side opening and the first plastic aperture retention wing projects outwardly through the first metal side opening.

10. The dual material U-base fastener of claim 9, wherein the first plastic aperture retention wing projects outwardly to a first plastic shoulder.

11. The dual material U-base fastener of claim 10, wherein the first plastic aperture retention wing is angled back toward a center of the plastic portion at a first region of the first plastic aperture retention wing between the first plastic shoulder and a first trailing end of the first plastic aperture retention wing, and the first region is designed to engage the aperture to couple the dual material U-base fastener to the aperture with the inner plastic and outer metal insertion ends extending through the aperture.

12. The dual material U-base fastener of claim 11, wherein the region between the first shoulder and the first trailing end comprises a concave shape.

13. The dual material U-base fastener of claim 11, wherein the second metal side includes a second metal side opening and a second plastic aperture retention wing projects outwardly through the second metal side opening, and the second plastic aperture retention wing projects outwardly to a second plastic shoulder, and the second plastic aperture retention wing is angled back toward a center of the plastic portion at a second region of the second plastic aperture retention wing between the second plastic shoulder and a second trailing end of the second plastic aperture retention wing, and wherein the first and second regions are designed to engage the aperture to couple the dual material U-base fastener to the aperture with the inner plastic and outer metal insertion ends extending through the aperture.

14. The dual material U-base fastener of claim 13, wherein the first and second regions between the first and second shoulders and the first and second trailing ends, respectively, each comprise a concave shape.

15. A dual material U-base fastener designed to connect a first component having a rib to a second component having an aperture comprising:
    a u-shaped metal portion including a first metal side and a second metal side connected at an outer metal insertion end to form the u-shaped metal portion, and the first metal side and the second metal side including a first opening and a second opening, respectively, therethrough, and supporting a first metal rib retention barb and a second metal rib retention barb, respectively;
    a u-shaped plastic portion including a first plastic side and a second plastic side connected at an inner plastic insertion end to form the u-shaped plastic portion, and the first plastic side and the second plastic side including a first plastic aperture retention wing and a second aperture retention wing, respectively;
    wherein the plastic portion and the metal portion are coupled together to define an interior rib receiving cavity between both the first and second metal sides of the metal portion and the first and second plastic sides of the plastic portion, and wherein the inner plastic insertion end is received in the outer metal insertion end, and wherein the aperture retention wings project outwardly through the first and second openings respectively, and wherein the first and second metal rib retention barbs extend inwardly into the interior rib receiving cavity; and wherein the first and second plastic aperture retention wings are designed to couple the dual material U-base fastener to the aperture with the inner plastic and outer metal insertion ends extending through the aperture, and wherein the first and second metal rib retention barbs are designed to couple the dual material U-base fastener to the rib with the rib received within the interior rib receiving cavity.

16. The dual material U-base fastener of claim 15, wherein a molded plastic material comprises the u-shaped plastic portion.

17. The dual material U-base fastener of claim 15, wherein a formed metal sheet material comprises the u-shaped metal portion.

18. The dual material U-base fastener of claim 15, wherein a molded plastic material comprises the u-shaped plastic portion and a formed metal sheet material comprises the u-shaped metal portion.

19. The dual material U-base fastener of claim 15, wherein the first metal rib retention barb is supported by a first metal barb extension between the first metal side of the metal portion and the first metal rib retention barb, and the second metal rib retention barb is supported by a second metal barb extension between the second metal side of the metal portion and the second metal rib retention barb.

20. The dual material U-base fastener of claim 19, wherein a third metal rib retention barb is supported by the first metal barb extension, and a fourth metal rib retention barb is supported by the first metal barb extension.

21. The dual material U-base fastener of claim 15, wherein the first plastic aperture retention wing projects outwardly to a first plastic shoulder and is angled back toward the interior rib receiving cavity at a first region of the first plastic aperture retention wing, and wherein the second plastic aperture retention wing projects outwardly to a second plastic shoulder and is angled back toward the interior rib receiving cavity at a second region of the second plastic aperture retention wing, and wherein the first and second regions are designed to engage the aperture to couple the dual material U-base fastener to the aperture with the inner plastic and outer metal insertion ends extending through the aperture.

22. The dual material U-base fastener of claim 21, wherein the first and second regions comprise a concave shape.

* * * * *